US012580484B2

(12) United States Patent
Kita et al.

(10) Patent No.: US 12,580,484 B2
(45) Date of Patent: Mar. 17, 2026

(54) LOAD DRIVE CIRCUIT, ELECTRONIC CONTROL DEVICE, AND CONTROL METHOD FOR ELECTRONIC CONTROL DEVICE

(71) Applicant: Hitachi Astemo, Ltd., Hitachinaka (JP)

(72) Inventors: Masato Kita, Hitachinaka (JP); Yoichiro Kobayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 223 days.

(21) Appl. No.: 18/285,796

(22) PCT Filed: Feb. 16, 2022

(86) PCT No.: PCT/JP2022/006076
§ 371 (c)(1),
(2) Date: Oct. 5, 2023

(87) PCT Pub. No.: WO2022/230313
PCT Pub. Date: Nov. 3, 2022

(65) Prior Publication Data
US 2024/0372469 A1 Nov. 7, 2024

(30) Foreign Application Priority Data

Apr. 27, 2021 (JP) ................................. 2021-074826

(51) Int. Cl.
*H02M 3/158* (2006.01)
*H02M 1/08* (2006.01)
(52) U.S. Cl.
CPC ............. *H02M 3/158* (2013.01); *H02M 1/08* (2013.01)
(58) Field of Classification Search
CPC ...... H02M 1/08; H02M 1/0006; H02M 3/155; H02M 3/158; G05F 1/56; H03K 17/06; H03K 17/687
See application file for complete search history.

(56) References Cited

U.S. PATENT DOCUMENTS

| | | | | | |
|---|---|---|---|---|---|
| 5,914,589 | A | * | 6/1999 | Erckert | H03K 17/063 |
| | | | | | 323/284 |
| 6,201,717 | B1 | * | 3/2001 | Grant | H02M 1/08 |
| | | | | | 363/16 |

(Continued)

FOREIGN PATENT DOCUMENTS

| | | | |
|---|---|---|---|
| JP | 2008-293490 A | | 12/2008 |
| JP | 2010136532 A | * | 6/2010 |

(Continued)

OTHER PUBLICATIONS

International Search Report (PCT/ISA/210) issued in PCT Application No. PCT/JP2022/006076 dated Apr. 26, 2022 with English translation (4 pages).

(Continued)

*Primary Examiner* — Monica Lewis
*Assistant Examiner* — Jye-June Lee
(74) *Attorney, Agent, or Firm* — Crowell & Moring LLP

(57) ABSTRACT

Provided are a highly reliable load drive circuit that includes a switching circuit that selects a power supply voltage, and is capable of seamlessly switching the power supply voltage without using a switch or a determination circuit, an electronic control device using the load drive circuit, and a control method for the electronic control device. The load drive circuit includes: a booster circuit that boosts an output from a power supply; and a voltage switching circuit that switches the output from the power supply and an output from the booster circuit, in which the voltage switching circuit includes a first MOSFET, a second MOSFET, and a gate voltage generation circuit that generates gate voltages of the first MOSFET and the second MOSFET, gate terminals of the first MOSFET and the second MOSFET are connected to the gate voltage generation circuit, source terminals of the first MOSFET and the second MOSFET are connected to the same node, a drain terminal of the first (Continued)

MOSFET is connected to an output terminal of the booster circuit, a drain terminal of the second MOSFET is connected to an output terminal of the power supply, and the output from the power supply and the output from the booster circuit are seamlessly switched according to an output voltage from the power supply.

8 Claims, 8 Drawing Sheets

(56) References Cited

U.S. PATENT DOCUMENTS

| | | | |
|---|---|---|---|
| 2006/0145673 A1 | 7/2006 | Fogg et al. | |
| 2008/0284407 A1 | 11/2008 | Miermont et al. | |
| 2010/0295835 A1* | 11/2010 | Kim .......................... | G05F 1/56 |
| | | | 323/299 |
| 2016/0065072 A1* | 3/2016 | Xiu ......................... | H02M 1/08 |
| | | | 323/271 |
| 2016/0072382 A1* | 3/2016 | Ranmuthu .............. | H02M 1/08 |
| | | | 363/60 |
| 2020/0382041 A1* | 12/2020 | Abdelli .................. | H02K 7/116 |
| 2023/0100060 A1* | 3/2023 | Balasubramanian ......................... | |
| | | | H02M 1/0006 |
| | | | 327/536 |

FOREIGN PATENT DOCUMENTS

| | | |
|---|---|---|
| JP | 2014-11841 A | 1/2014 |
| JP | 2015-88872 A | 5/2015 |
| JP | 2017-158290 A | 9/2017 |

OTHER PUBLICATIONS

Japanese-language Written Opinion (PCT/ISA/237) issued in PCT Application No. PCT/JP2022/006076 dated Apr. 26, 2022 with English translation (7 pages).

* cited by examiner

LOAD DRIVE CIRCUIT, ELECTRONIC CONTROL DEVICE, AND CONTROL METHOD FOR ELECTRONIC CONTROL DEVICE

TECHNICAL FIELD

The present invention relates to a configuration of a load drive circuit and control thereof, and particularly to a technique effective for application to a load drive circuit including a switching circuit for selecting a power supply voltage.

BACKGROUND ART

In recent years, in the field of car electronics, many electronic control units (ECUs) have been put into practical use for power trains, automated driving, and the like. In these ECUs, a high side driver using an N-type semiconductor element having a low on-resistance is used for load driving. For example, high side driver drive control using an NMOS requires a voltage higher than a source voltage, and thus a high voltage boosted by a booster circuit is used.

In a case where, for example, a charge pump circuit is always used as the booster circuit, the boosted voltage can be secured up to a region where a power supply voltage is low, and thus stable operation can be guaranteed. However, in a region where the power supply voltage is high, there is a problem that boosting capability becomes excessive and power consumption increases.

In order to solve this problem, for example, PTL 1 discloses an example in which a boosted voltage by a bootstrap circuit is used in a case where the power supply voltage is high, and the boosted voltage by the charge pump circuit is used in a case where the power supply voltage decreases, in a case of a switching regulator.

CITATION LIST

Patent Literature

PTL 1: JP 2014-11841 A

SUMMARY OF INVENTION

Technical Problem

In addition to the problem that the power consumption is increased by the booster circuit in a case where the power supply voltage is high, there is a possibility of malfunction due to a sudden change in battery voltage peculiar to a case of being mounted on a vehicle in a configuration in which a decrease in power supply voltage (a battery voltage in a case of being mounted on a vehicle) is detected and the boosted voltage by the charge pump circuit is used as in PTL 1.

Therefore, it is desirable that switching of a voltage to be supplied to a circuit that performs drive control of the high side driver using the N-type semiconductor element such as the NMOS is performed in a seamless manner that does not use a switch or a determination circuit.

Therefore, an object of the present invention is to provide a highly reliable load drive circuit that includes a switching circuit that selects a power supply voltage, and is capable of seamlessly switching the power supply voltage without using a switch or a determination circuit, an electronic control device using the load drive circuit, and a control method for the electronic control device.

Solution to Problem

In order to solve the above problem, the present invention includes: a booster circuit that boosts an output from a power supply; and a voltage switching circuit that switches the output from the power supply and an output from the booster circuit, in which the voltage switching circuit includes a first MOSFET, a second MOSFET, and a gate voltage generation circuit that generates gate voltages of the first MOSFET and the second MOSFET, gate terminals of the first MOSFET and the second MOSFET are connected to the gate voltage generation circuit, source terminals of the first MOSFET and the second MOSFET are connected to the same node, a drain terminal of the first MOSFET is connected to an output terminal of the booster circuit, a drain terminal of the second MOSFET is connected to an output terminal of the power supply, and the output from the power supply and the output from the booster circuit are seamlessly switched according to an output voltage from the power supply.

In addition, the present invention includes a load drive circuit that performs drive control of a load, and a microcontroller, and the load drive circuit is a highly reliable load drive circuit capable of seamlessly switching a power supply voltage without using a switch or a determination circuit.

Further, the present invention is a control method for an electronic control device including a booster circuit that boosts an output from a power supply and a voltage switching circuit that switches the output from the power supply and an output from the booster circuit, the control method including: seamlessly switching the output from the power supply and the output from the booster circuit according to an output voltage from the power supply and outputting the output to a load.

Advantageous Effects of Invention

According to the present invention, it is possible to implement the highly reliable load drive circuit that includes the switching circuit that selects a power supply voltage and is capable of seamlessly switching the power supply voltage without using a switch or a determination circuit, the electronic control device using the load drive circuit, and the control method for the electronic control device.

Accordingly, it is possible to reduce power consumption and improve reliability of the electronic control device.

Problems, configurations, and effects other than those described above will become the following apparent by description of embodiments.

DESCRIPTION OF EMBODIMENTS

Hereinafter, embodiments of the present invention will be described with reference to the drawings. Since the drawings are simplified, the technical scope of the present invention should not be narrowly interpreted based on the description of the drawings. In the description of the present specification, the same elements are denoted by the same reference signs, and an overlapping description is omitted.

First Embodiment

Figure 1:
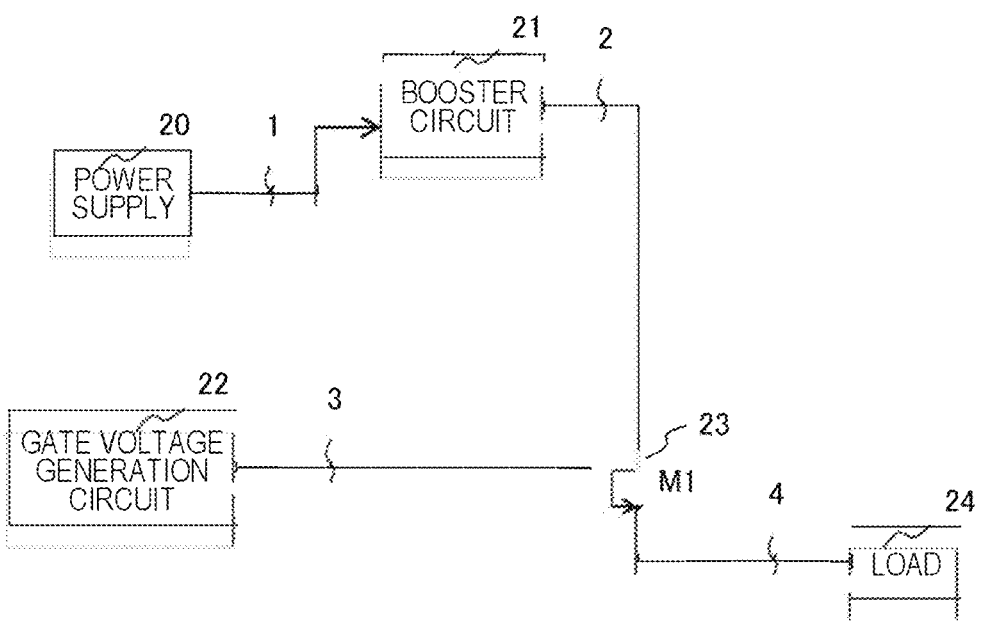
FIG. 1 is a diagram illustrating a configuration of a load drive circuit according to the related art.

First, a configuration of a load drive circuit according to the related art and problems thereof will be described with reference to FIG. 1. FIG. 1 is a diagram illustrating the configuration of the load drive circuit according to the related art.

As illustrated in FIG. 1, in the load drive circuit according to the related art, a load 24 is driven by a source follower of an NMOS (M1) 23.

The source follower outputs, to a source terminal of the NMOS (M1) 23, a VGS voltage (gate-source voltage), that is, a voltage decreased from a gate voltage by ((a voltage of a signal line 3)−(a voltage of a signal line 4)) according to a current output from the source terminal of the NMOS (M1) 23.

A voltage decreased from the voltage of the signal line 3 by the VGS voltage determined by an element size of the NMOS (M1) 23 and a current for driving the load 24 becomes an output voltage of the source follower (the voltage of the signal line 4).

A gate voltage generation circuit 22 supplies the gate voltage (the voltage of the signal line 3) in such a way that the voltage of the signal line 4 output to the load 24 falls within a predetermined range. An output voltage (signal line 2) of a booster circuit 21 is connected to a drain terminal of the NMOS (M1) 23 in order to ensure operation even in a region where an output voltage of a power supply 20 is low.

The configuration of the example according to the related art can ensure stable operation even in a region where the output voltage of the power supply 20 is low, but in a region where the output voltage of the power supply 20 is high, boosting by the booster circuit 21 becomes excessive, and thus, there is a problem that power consumption increases.

Figure 2:
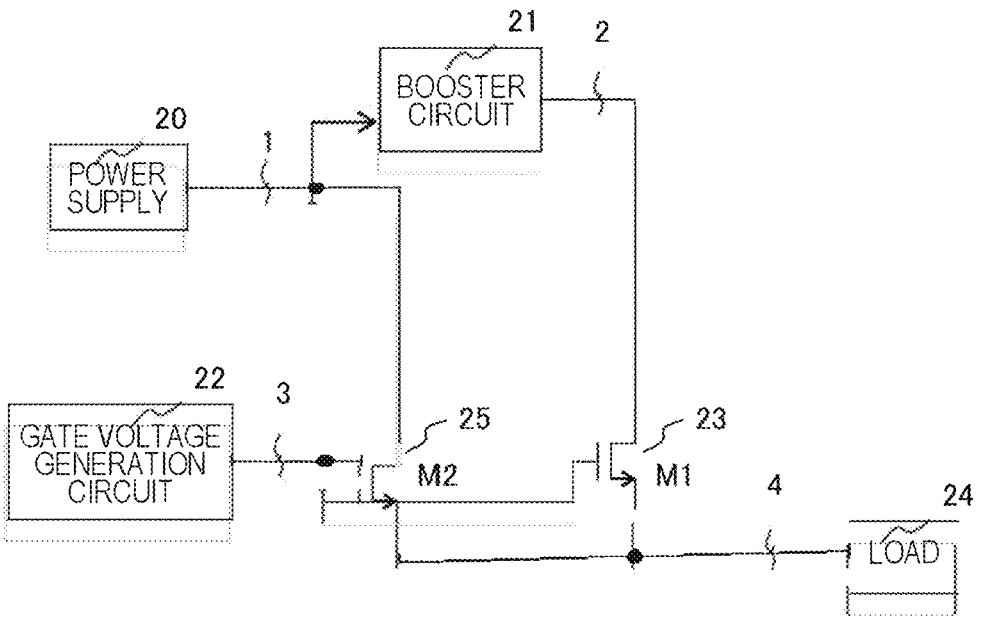
FIG. 2 is a diagram illustrating a configuration of a load drive circuit according to a first embodiment of the present invention.
Figure 3:
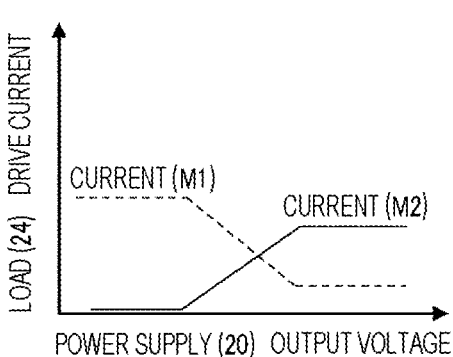
FIG. 3 is a diagram conceptually illustrating a load drive current in the configuration of FIG. 2.

Next, a load drive circuit according to the first embodiment of the present invention and a drive current thereof will be described with reference to FIGS. 2 and 3. FIG. 2 is a diagram illustrating a configuration of the load drive circuit according to the present embodiment. FIG. 3 is a diagram conceptually illustrating a load drive current in the configuration of FIG. 2.

The load drive circuit of the present embodiment is a circuit that reduces a supply current from a booster circuit 21 in order to reduce power consumption that is a problem in the example according to the related art.

As illustrated in FIG. 2, the load drive circuit of the present embodiment includes an NMOS (M2) 25 in addition to the configuration according to the related art (FIG. 1).

A gate terminal and a source terminal of the NMOS (M2) 25 are commonly connected to a gate terminal and a source terminal of an NMOS (M1) 23, respectively, and a drain terminal of the NMOS (M2) 25 is connected to an output voltage (signal line 1) of a power supply 20.

That is, the load drive circuit of the present embodiment has a configuration in which source followers having different drain voltage supply sources are connected in parallel to the load 24.

In a region where the output voltage of the power supply 20 is high, a current for driving the load 24 is shared by the NMOS (M1) 23 and the NMOS (M2) 25, so that an output current of a booster circuit 21, which is a current flowing through the NMOS (M1) 23, can be reduced.

A ratio of sharing the current flowing through the NMOS (M1) 23 and the NMOS (M2) 25 can be changed depending on an element size. When a W/L (gate width/gate length) ratio is larger in the NMOS (M2) 25 than in the NMOS (M1) 23, the current on the NMOS (M2) 25 side increases, and the current of the NMOS (M1) 23 can be further reduced.

Even in a case where the current for driving the load 24 cannot be supplied from the NMOS (M2) 25 side in a region where the output voltage of the power supply 20 is low, the current can be supplied only by the NMOS (M1) 23 using a boosted voltage, so that stable operation can be secured. At this time, since the output voltage of the power supply 20 is low, power consumption is small.

For example, a case is considered in which a size ratio of the NMOS (M1) 23 and the NMOS (M2) 25 having characteristics in which a drain voltage dependence in a MOS saturation region is negligibly small is set to 1:3.

In a region where the output voltage of the power supply 20 is high, a drive current of the load 24 is shared in a ratio of 1:3.

On the other hand, in a case where the drive current cannot be supplied from the NMOS (M2) 25 in a region where the output voltage of the power supply 20 is low, the drive current is shared in a ratio of 4:0.

In a case of an intermediate region between the region where the output voltage of the power supply 20 is high and the region where the output voltage of the power supply 20 is low, a transient sharing ratio is applied, which is illustrated in FIG. 3.

In addition, a value of the current flowing through the NMOS (M1) 23 differs by four times between the region where the output voltage of the power supply 20 is high and the region where the output voltage of the power supply 20 is low, but a value of the current in the MOS saturation region is proportional to $(VGS-Vth)^2$, and thus, a value of $(VGS-Vth)$ differs by two times. VGS is a gate-source voltage, and Vth is a MOS threshold voltage.

Here, in a case where the element size is set in such a way that the value of $(VGS-Vth)$ is, for example, 300 mV, Vth does not change. Therefore, when the current increases by four times, the VGS voltage increases by about 300 mV, and becomes 600 mV. A voltage output to the load 24 varies depending on the element size of the NMOS of the source follower in the region where the output voltage of the power supply 20 is high and the region where the output voltage of the power supply 20 is low, but there is no problem as long as the characteristics of the circuit to be used are not affected.

As described above, with the load drive circuit of the present embodiment, it is possible to reduce power consumption in the region where the output voltage of the power supply 20 is high by seamless switching without using a switch or a determination circuit.

As described above, the load drive circuit of the present embodiment includes the booster circuit 21 that boosts an output from the power supply 20, and a voltage switching circuit 100 that seamlessly switches the output from the power supply 20 and an output from the booster circuit 21, in which the voltage switching circuit 100 includes a first MOSFET (NMOS (M1) 23), a second MOSFET (NMOS (M2) 25), and a gate voltage generation circuit 22 that generates gate voltages of the first MOSFET (NMOS (M1) 23) and the second MOSFET (NMOS (M2) 25), gate terminals of the first MOSFET (NMOS (M1) 23) and the second MOSFET (NMOS (M2) 25) are connected to the gate voltage generation circuit 22, source terminals of the first MOSFET (NMOS (M1) 23) and the second MOSFET (NMOS (M2) 25) are connected to the same node, a drain terminal of the first MOSFET (NMOS (M1) 23) is connected to an output terminal of the booster circuit 21, a drain terminal of the second MOSFET (NMOS (M2) 25) is connected to an output terminal of the power supply 20, and the output from the power supply 20 and the output from the booster circuit 21 are seamlessly switched according to the output voltage from the power supply 20.

As a result, it is possible to implement a highly reliable load drive circuit capable of seamlessly switching a power supply voltage without using a switch or a determination circuit.

Second Embodiment

Figure 4:
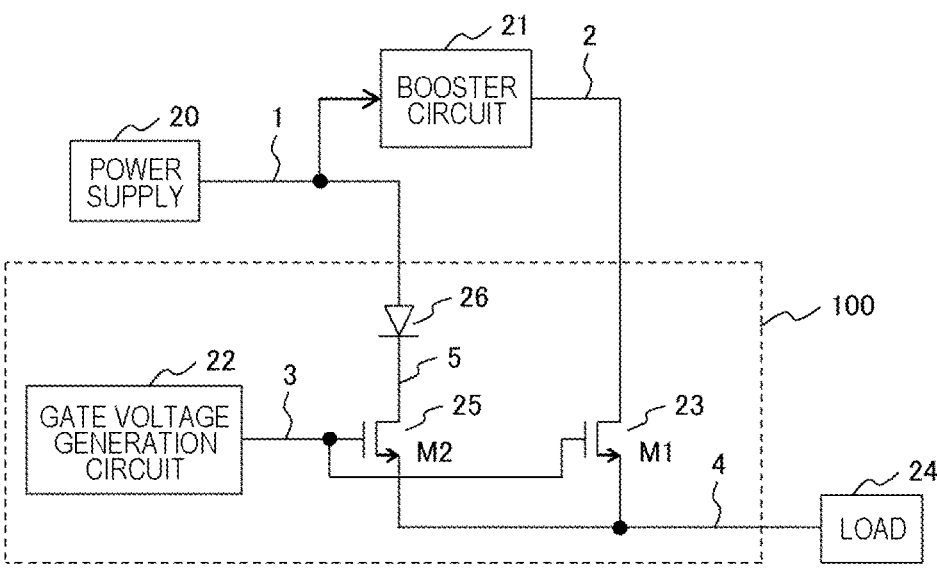
FIG. 4 is a diagram illustrating a configuration of a load drive circuit according to a second embodiment of the present invention.

A load drive circuit according to a second embodiment of the present invention will be described with reference to FIG. 4. FIG. 4 is a diagram illustrating a configuration of the load drive circuit according to the present embodiment.

As illustrated in FIG. 4, in the load drive circuit of the present embodiment, a diode 26 and a signal line 5 are added to the configuration of the first embodiment (FIG. 2).

In the present embodiment, a portion including a source follower of an NMOS (M1) 23, a source follower of an NMOS (M2) 25, a gate voltage generation circuit 22, and the diode 26 is defined as a voltage switching circuit 100.

By adding the diode 26, it is possible to prevent a current from flowing back from a signal line 4 to a signal line 1 via the NMOS (M2) 25 in a case where a voltage of the signal line 4 is high in a region where an output voltage of a power supply 20 is low.

Third Embodiment

Figure 5:
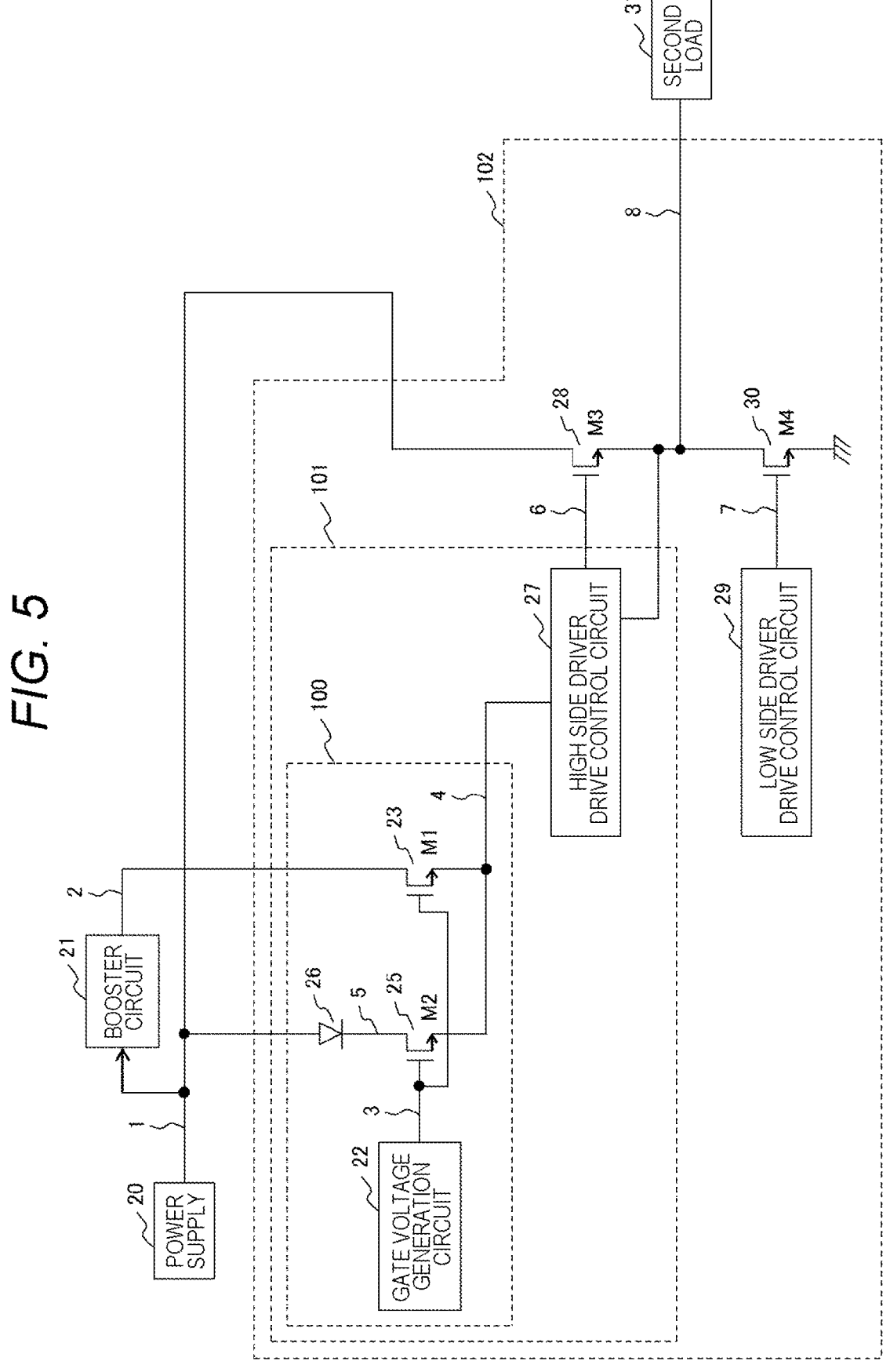
FIG. 5 is a diagram illustrating a configuration of a load drive circuit according to a third embodiment of the present invention.
Figure 6:
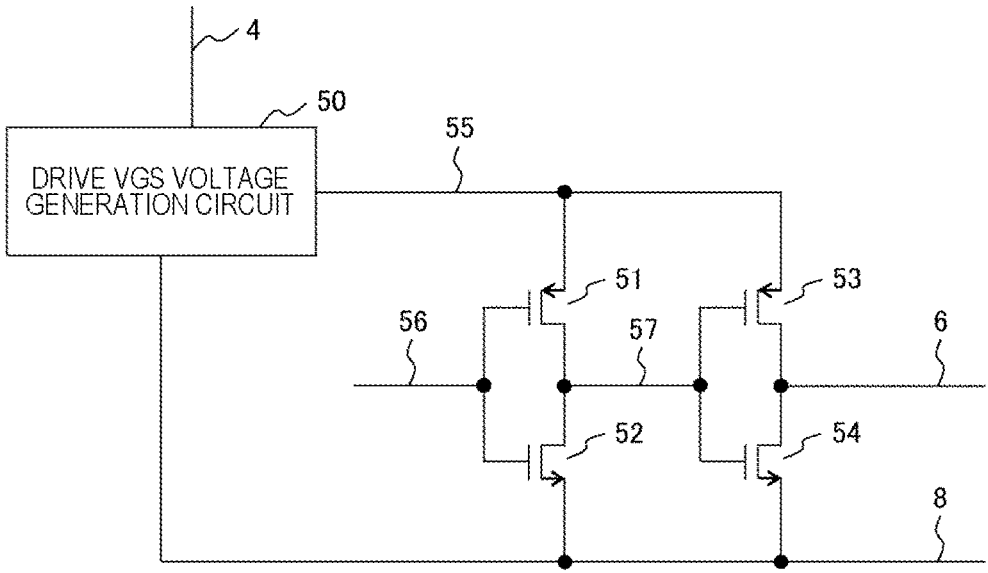
FIG. 6 is a diagram illustrating a configuration of a high side driver drive control circuit of FIG. 5.

A load drive circuit according to a third embodiment of the present invention will be described with reference to FIGS. 5 and 6. FIG. 5 is a diagram illustrating a configuration of the load drive circuit according to the present embodiment. FIG. 6 is a diagram illustrating a configuration of a high side driver drive control circuit of FIG. 5.

In the present embodiment, the load 24 of the second embodiment (FIG. 4) is embodied as a high side driver drive control circuit 27.

The load drive circuit of the present embodiment is a driver circuit that includes a high side driver NMOS (M3)

28, the high side driver drive control circuit 27, a low side driver NMOS (M4) 30, and a low side driver drive control circuit 29 and drives a second load 31 with an output voltage of a power supply 20 as a Hi level and GND as a Lo level.

A circuit including a voltage switching circuit 100 and the high side driver drive control circuit 27 is referred to as a high side driver control circuit 101. The entire circuit including the voltage switching circuit 100, the high side driver drive control circuit 27, the low side driver drive control circuit 29, the high side driver NMOS (M3) 28, and the low side driver NMOS (M4) 30 is referred to as a driver circuit 102.

Here, an NMOS is used as an example of an N-type semiconductor element used as a high side driver, but an element such as an NPN bipolar transistor or an IGBT can also be used as the N-type semiconductor element.

FIG. 6 illustrates an example of a circuit configuration of the high side driver drive control circuit 27. The high side driver drive control circuit 27 controls a gate terminal (signal line 6) of the high side driver NMOS (M3) 28 with a VGS voltage (gate-source voltage) with reference to a source terminal (signal line 8) to control the high side driver NMOS (M3) 28.

The Hi level of the VGS voltage is a voltage (signal line 55) generated using a drive VGS voltage generation circuit 50 with a current supplied from an output (signal line 4) of the voltage switching circuit 100 with reference to the source terminal (signal line 8). The Lo level is a voltage of the source terminal (signal line 8) of the high side driver NMOS (M3) 28.

An on/off control signal (signal line 6) of the high side driver NMOS (M3) 28 is output via an inverter circuit including a PMOS 51 and an NMOS 52 and an inverter circuit including a PMOS 53 and an NMOS 54 by using a Hi level/Lo level of a transmission signal (signal line 56) from an external circuit as an input signal.

When the high side driver NMOS (M3) 28 is turned on and the low side driver NMOS (M4) 30 is turned off, the voltage of the source terminal (signal line 8) rises to an output voltage level of the power supply 20, and thus, a voltage of the gate terminal (signal line 6) needs to be higher by VGS.

In the high side driver drive control circuit 27, the PMOS 53 of the inverter circuit illustrated in FIG. 6 is turned on, the NMOS 54 is turned off, the PMOS 51 is turned off, and the NMOS 52 is turned on, and the Hi level (signal line 55) voltage=(the output voltage of the power supply 20)+(the VGS voltage of the high side driver NMOS (M3) 28).

Since a voltage of the output (signal line 4) of the voltage switching circuit 100 needs to be higher than the output voltage of the power supply 20, current supply from the NMOS (M2) 25 side of the voltage switching circuit 100 is impossible, and all the currents necessary for generating the Hi level (signal line 55) in the drive VGS voltage generation circuit 50 are supplied from an output voltage (signal line 2) of a booster circuit 21.

When the high side driver NMOS (M3) 28 is turned off and the low side driver NMOS (M4) 30 is turned on, the voltage of the source terminal (signal line 8) decreases to the GND level. Therefore, in the high side driver drive control circuit 27, the PMOS 53 of the inverter circuit illustrated in FIG. 6 is turned off, the NMOS 54 is turned on, the PMOS 51 is turned on, the NMOS 52 is turned off, and the Hi level (signal line 55) voltage=(GND)+(the VGS voltage of the high side driver NMOS (M3) 28).

In a region where the output voltage of the power supply 20 is high, the voltage of the output (signal line 4) of the voltage switching circuit 100 is higher than the VGS voltage of the high side driver NMOS (M3) 28. Therefore, the current necessary for generating the Hi level (signal line 55) in the drive VGS voltage generation circuit 50 can be supplied from the NMOS (M2) 25 side of the voltage switching circuit 100, and the current from the booster circuit 21 can be reduced.

As described above, although it is limited to only a case where the high side driver NMOS (M3) 28 is turned off, a current supplied from the booster circuit 21 can be reduced by the voltage switching circuit 100.

Fourth Embodiment

Figure 7:
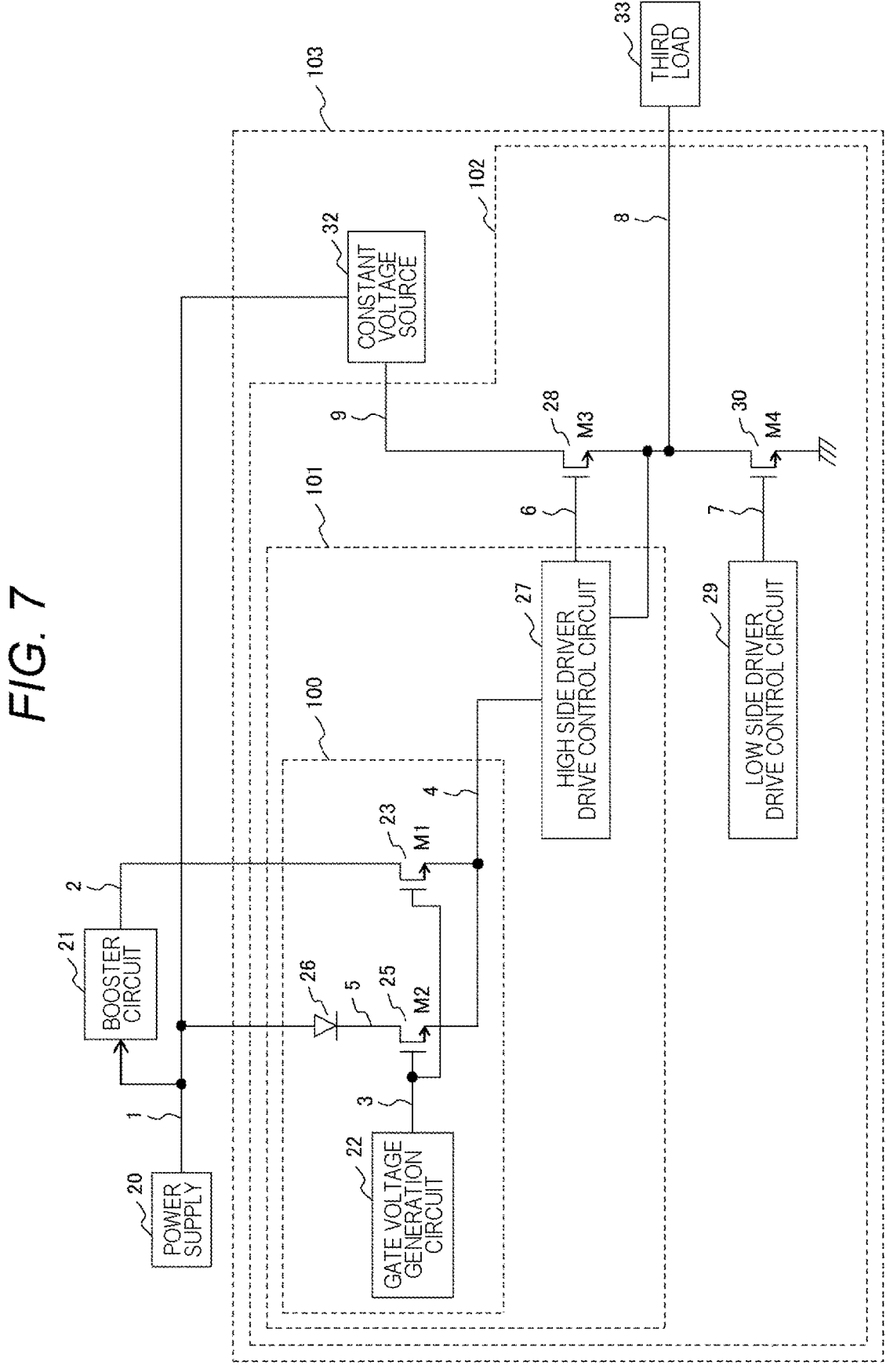
FIG. 7 is a diagram illustrating a configuration of a load drive circuit according to a fourth embodiment of the present invention.

A load drive circuit according to a fourth embodiment of the present invention will be described with reference to FIG. 7. FIG. 7 is a diagram illustrating a configuration of the load drive circuit according to the present embodiment.

As illustrated in FIG. 7, in the load drive circuit of the present embodiment, a constant voltage source 32 and a signal line 9 are added to the configuration of the third embodiment (FIG. 5).

Since a voltage level on a high side driver side is changed to a voltage of the constant voltage source 32, a load of a driver circuit is changed from the second load 31 to a third load 33. In addition, the entire circuit to which the constant voltage source 32 is added is illustrated as a driver circuit 103. For the sake of convenience, the same reference signs as those in FIG. 5 are used for the others.

The constant voltage source 32 is a circuit that outputs a desired constant voltage by using a power supply 20. Here, the constant voltage source 32 is a constant voltage source that outputs a voltage lower than an output voltage of the power supply 20 and outputs a predetermined voltage in a region where the output voltage of the power supply 20 is high. In a case where the output voltage of the power supply 20 is lower than a predetermined voltage in a region where the output voltage of the power supply voltage 20 is low, the predetermined voltage cannot be output. Therefore, a voltage lower than the voltage output from the power supply 20 and lower than the predetermined voltage is output.

A difference from the third embodiment (FIG. 5) is that, in a case of similarly considering a case where a high side driver NMOS (M3) 28 is turned on, when the high side driver NMOS (M3) 28 is turned on and a low side driver NMOS (M4) 30 is turned off, a voltage of a source terminal (signal line 8) rises to an output voltage level of the constant voltage source 32, and a voltage of a gate terminal (signal line 6) needs to be higher by VGS.

Therefore, in a case of the voltage of the Hi level (signal line 55) in the high side driver drive control circuit illustrated in FIG. 6, the Hi level (signal line 55) voltage=(the output voltage of the constant voltage source 32)+(the VGS of the high side driver NMOS (M3) 28).

In addition to a case where the high side driver NMOS (M3) 28 described in the third embodiment is turned off, even in a case where the high side driver NMOS (M3) 28 is turned on, when the output voltage of the constant voltage source 32 is sufficiently lower than the output voltage of the power supply 20 in a region where the output voltage of the power supply 20 is high, a current necessary for generating a Hi level (signal line 55) in a drive VGS voltage generation circuit 50 can be supplied from an NMOS (M2) 25 side of a voltage switching circuit 100, and a current from a booster circuit 21 can be reduced.

Fifth Embodiment

A load drive circuit according to a fifth embodiment of the present invention will be described with reference to FIG. 8.

Figure 8:
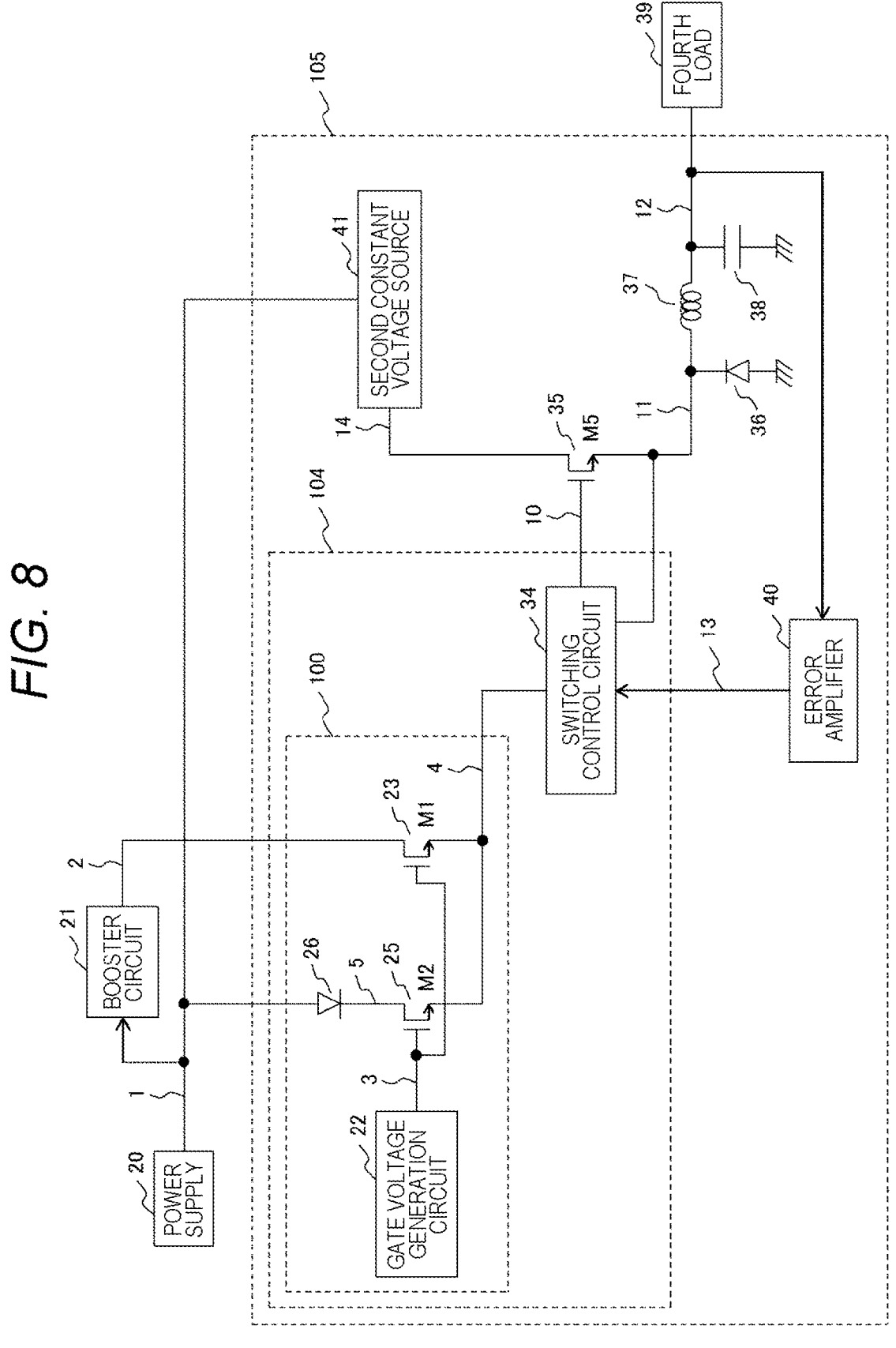
FIG. 8 is a diagram illustrating a configuration of a load drive circuit according to a fifth embodiment of the present invention.

FIG. 8 is a diagram illustrating a configuration of the load drive circuit according to the present embodiment.

In a configuration of a step-down switching regulator illustrated in FIG. 8, on/off of an NMOS (M5) 35 as a main switch by a switching control circuit 34 is controlled by a feedback loop from an output voltage (signal line 12) via an error amplifier 40, a desired output voltage (signal line 12) is obtained from an output voltage of a second constant voltage source 41, and a fourth load 39 is driven.

A switching circuit including a voltage switching circuit 100 and the switching control circuit 34 is denoted by 104, and the entire switching regulator including the switching circuit 104, the error amplifier 40, and the second constant voltage source 41 is denoted by 105.

The second constant voltage source 41 has characteristics similar to those of the constant voltage source 32 described in the fourth embodiment (FIG. 7).

The main switch NMOS (M5) 35 of the switching regulator 105 is a high side driver, and the switching control circuit 34 corresponds to a high side driver drive control circuit 27 of the fourth embodiment (FIG. 7).

A source terminal voltage (signal line 11) rises to an output voltage level of the second constant voltage source 41 when the NMOS (M5) 35 is turned on, and falls to (VF voltage of GND-diode 36) when the NMOS (M5) 35 is turned off.

Therefore, when the high side driver NMOS (M5) 35 is turned off, the operation is performed in the same manner as in the third embodiment (FIG. 5), and when the high side driver NMOS (M5) 35 is turned on, the operation is performed in the same manner as in fourth embodiment (FIG. 7). Therefore, when the output voltage of the second constant voltage source 41 is sufficiently lower than an output voltage of a power supply 20 in a region where the output voltage of the power supply 20 is high, a current can be supplied from an NMOS (M2) 25 side of the voltage switching circuit 100, and a current from a booster circuit 21 can be reduced.

Sixth Embodiment

Figure 9:
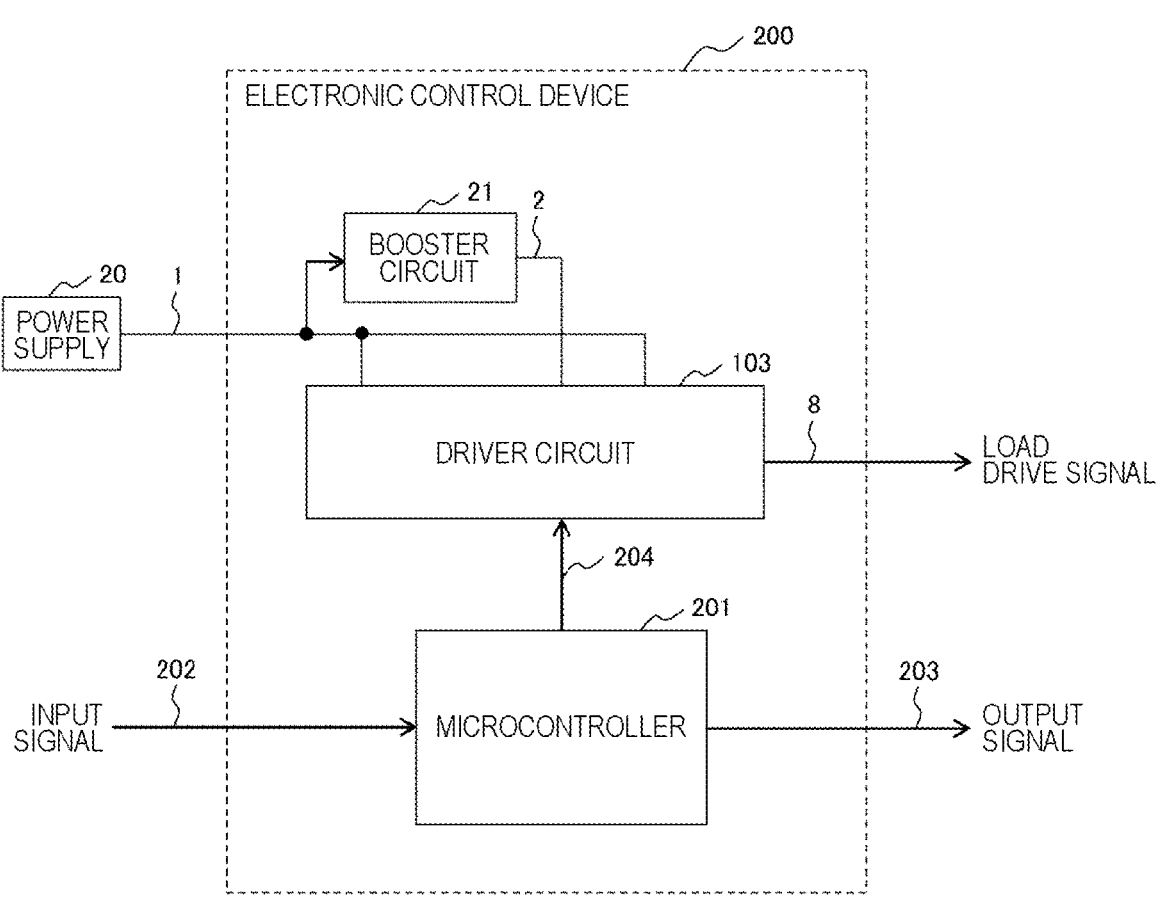
FIG. 9 is a diagram illustrating a schematic configuration of an electronic control device according to a sixth embodiment of the present invention.

An electronic control device according to a sixth embodiment of the present invention will be described with reference to FIG. 9. FIG. 9 is a diagram illustrating a schematic configuration of the electronic control device according to the present embodiment.

FIG. 9 illustrating an electronic control unit 200 of the present embodiment is, for example, a configuration diagram of an electronic control unit (hereinafter, referred to as ECU) equipped with a driver circuit 103 described in the fourth embodiment (FIG. 7), and the electronic control unit 200 is specifically an in-vehicle ECU.

FIG. 9 illustrates an in-vehicle system including a power supply 20 (corresponding to a battery) and the ECU 200. A booster circuit 21 that boosts an output voltage of the power supply 20, the driver circuit 103 of FIG. 7, and a microcontroller 201 are provided inside the ECU 200.

The microcontroller 201 performs various types of control by using a plurality of input signals 202 and a plurality of output signals 203. In addition, the driver circuit 103 is controlled according to a control signal 204, and a load is driven by an output (signal line 8: load drive signal) of the driver circuit 103.

In this example, the driver circuit 103 is used, but a driver circuit 102 described in the third embodiment (FIG. 5) can also be used.

Although not illustrated in FIG. 9, the ECU 200 includes a plurality of high side driver circuits, and power consumption can be reduced by a voltage switching circuit 100.

Seventh Embodiment

Figure 10:
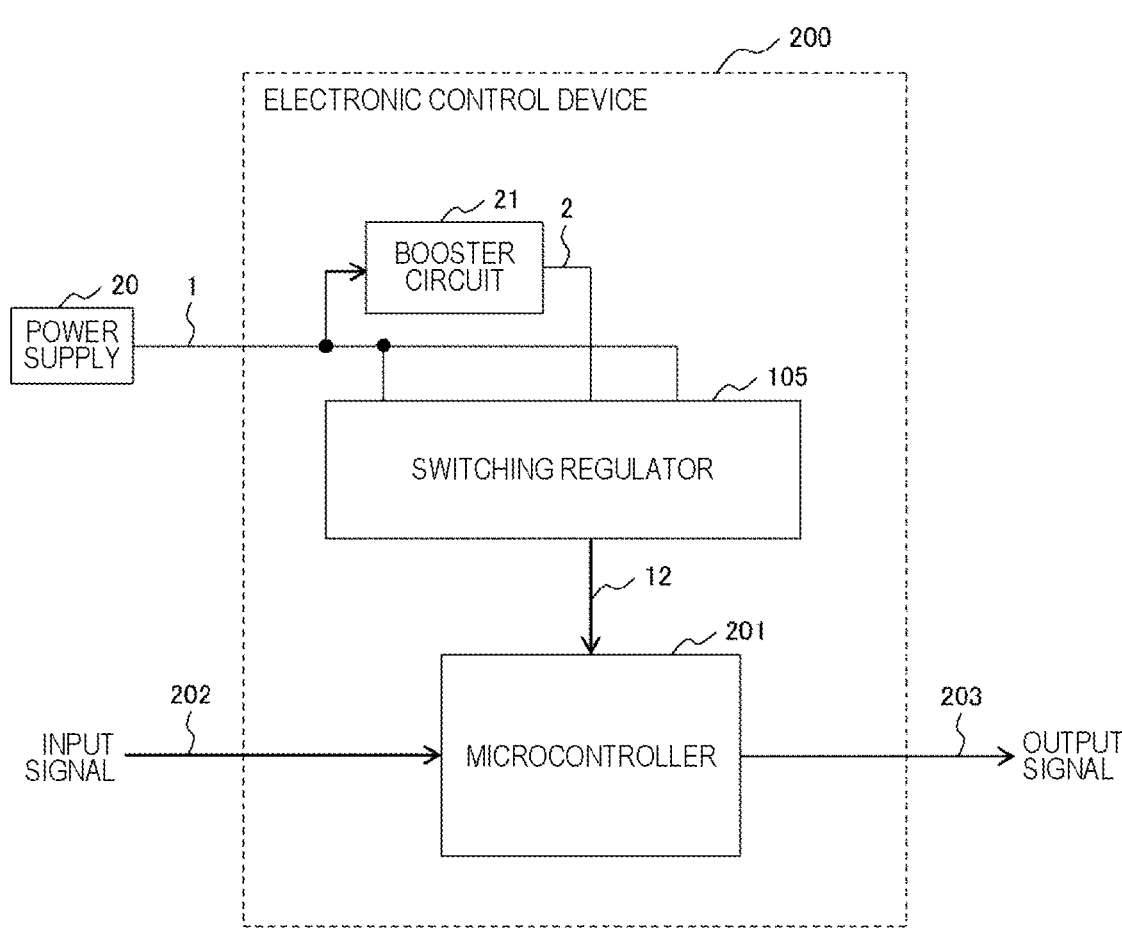
FIG. 10 is a diagram illustrating a schematic configuration of an electronic control device according to a seventh embodiment of the present invention.

An electronic control device according to a seventh embodiment of the present invention will be described with reference to FIG. 10. FIG. 10 is a diagram illustrating a schematic configuration of the electronic control device according to the present embodiment.

FIG. 10 illustrating an electronic control unit 200 of the present embodiment is, for example, a configuration diagram of an electronic control unit (ECU) equipped with a switching regulator 105 described in the fifth embodiment (FIG. 8), and the electronic control unit 200 is specifically an in-vehicle ECU.

FIG. 10 illustrates an in-vehicle system including a power supply 20 (corresponding to a battery) and the ECU 200. A booster circuit 21 that boosts an output voltage of the power supply 20, the switching regulator 105 of FIG. 8, and a microcontroller 201 are provided inside the ECU 200.

An output voltage (signal line 12) of the switching regulator 105 is supplied to the microcontroller 201 as a power supply voltage. The microcontroller 201 performs various types of control by using a plurality of input signals 202 and a plurality of output signals 203.

The ECU 200 of the present embodiment is equipped with the switching regulator 105 and operates by controlling a main switch which is a high side driver circuit, and power consumption can be reduced by a voltage switching circuit 100.

By using the electronic control device described in the sixth embodiment or the seventh embodiment in an in-vehicle electronic control device such as a drive system of a transmission or a drive system of a power train, it is possible to seamlessly switch a power supply voltage, and it is possible to prevent malfunction or the like due to a sudden change in battery voltage.

Further, the present invention is not limited to the embodiments described above, but includes various modified examples. For example, the above-described embodiments have been described in detail in order to explain the present invention in an easy-to-understand manner, and the present invention is not necessarily limited to those having all the configurations described. Further, part of a configuration of one embodiment can be replaced with a configuration of another embodiment, and the configuration of another embodiment can be added to the configuration of the one embodiment. In addition, another configuration can be added to, deleted from, and substituted for a part of the configuration of each embodiment.

REFERENCE SIGNS LIST

1 to 14 signal line
20 power supply
21 booster circuit
22 gate voltage generation circuit
23 NMOS (M1)
24 load
25 NMOS (M2)
26 diode
27 high side driver drive control circuit
28 high side driver NMOS (M3)
29 low side driver drive control circuit
30 low side driver NMOS (M4)

31 second load
32 constant voltage source
33 third load
34 switching control circuit
35 NMOS (M5)
36 diode
37 inductor
38 capacitor
39 fourth load
40 error amplifier
41 second constant voltage source
50 drive VGS voltage generation circuit
51, 53 PMOS
52, 54 NMOS
55, 56, 57 signal line
100 voltage switching circuit
101 high side driver control circuit
102 driver circuit
103 driver circuit
104 switching circuit
105 switching regulator
200 electronic control unit (ECU)
201 microcontroller
202, 203, 204 signal line

The invention claimed is:

1. A load drive circuit comprising:
a booster circuit that boosts an output from a power supply; and
a voltage switching circuit that switches the output from the power supply and an output from the booster circuit, wherein the voltage switching circuit includes a first MOSFET, a second MOSFET, and a gate voltage generation circuit that generates gate voltages of the first MOSFET and the second MOSFET,
gate terminals of the first MOSFET and the second MOSFET are connected to the gate voltage generation circuit,
source terminals of the first MOSFET and the second MOSFET are connected to the same node,
a drain terminal of the first MOSFET is connected to an output terminal of the booster circuit,
a drain terminal of the second MOSFET is connected to an output terminal of the power supply, and
the output from the power supply and the output from the booster circuit are seamlessly switched according to an output voltage from the power supply, wherein
the voltage switching circuit is mounted on a high side driver control circuit,
a voltage of a current supply source of a high side driver driven by the high side driver control circuit is lower than the output voltage of the power supply, and
the load drive circuit operates with a current from the second MOSFET using the power supply as a supply source when the high side driver is turned on.

2. The load drive circuit according to claim 1, further comprising a diode connected between the power supply and the drain terminal of the second MOSFET with a forward direction from the power supply toward the drain terminal of the second MOSFET.

3. The load drive circuit according to claim 1, wherein element sizes of the first MOSFET and the second MOSFET are different from each other.

4. The load drive circuit according to claim 3, wherein a gate width/gate length ratio of the second MOSFET is larger than that of the first MOSFET.

5. The load drive circuit according to claim 1, wherein the high side driver control circuit is a switching circuit of a switching regulator that converts an input DC voltage into a target DC voltage by a switching operation of a switching element and outputs the target DC voltage.

6. An electronic control device comprising:

a load drive circuit that performs drive control of a load; and a microcontroller, wherein the load drive circuit is the load drive circuit according to claim 1.

7. The electronic control device according to claim 6, wherein the load drive circuit includes a high side driver circuit, and an output voltage of a switching regulator equipped with the high side driver circuit is a power supply source of the microcontroller.

8. The electronic control device according to claim 6, wherein the electronic control device is used in a drive system of a transmission or a drive system of a power train.

\*   \*   \*   \*   \*